United States Patent
Summers et al.

(10) Patent No.: US 8,161,800 B2
(45) Date of Patent: Apr. 24, 2012

(54) METHODS AND SYSTEMS FOR VALVE LEAK SIMULATION

(75) Inventors: Sean Summers, Carson City, NV (US);
Brian Howard, Issaquah, WA (US);
Roger Hala, Gardnerville, NV (US);
John Grant, Gardnerville, NV (US);
David R. Van Wagenen, Minden, NV (US)

(73) Assignee: General Electric Company, Schenectady, NY (US)

( * ) Notice: Subject to any disclaimer, the term of this patent is extended or adjusted under 35 U.S.C. 154(b) by 674 days.

(21) Appl. No.: 12/346,471

(22) Filed: Dec. 30, 2008

(65) Prior Publication Data
US 2010/0162797 A1    Jul. 1, 2010

(51) Int. Cl.
*G01M 3/28* (2006.01)
*F01C 21/00* (2006.01)
(52) U.S. Cl. ........................ 73/40.5 R; 418/2
(58) Field of Classification Search ............... 73/40.5 R; 418/2
See application file for complete search history.

(56) References Cited

U.S. PATENT DOCUMENTS

| | | | | |
|---|---|---|---|---|
| 3,921,435 | A * | 11/1975 | Howard | 374/5 |
| 4,016,743 | A * | 4/1977 | Henderson et al. | 73/1.04 |
| 6,532,807 | B1 * | 3/2003 | Krauss | 73/114.68 |
| 2007/0068225 | A1 * | 3/2007 | Brown | 73/40.5 A |
| 2007/0154325 | A1 * | 7/2007 | Grant et al. | 417/63 |
| 2008/0264157 | A1 * | 10/2008 | Degler et al. | 73/114.45 |

* cited by examiner

*Primary Examiner* — Daniel Larkin
(74) *Attorney, Agent, or Firm* — Armstrong Teasdale LLP

(57) ABSTRACT

A method for simulating a compressor valve leak is described. The method includes inducing a flow of gas past a compressor valve that is coupled to a bypass block, wherein the bypass block defines a first passageway and a second passageway therein, and wherein the bypass block is also coupled to a bypass valve that is in flow communication with the second passageway. The method also includes measuring a first temperature and a second temperature. The first temperature is the temperature of the gas flowing through the first passageway of the bypass block and the second temperature is the temperature of gas flowing within the second passageway. The method also includes adjusting the bypass valve to divert a portion of the gas flowing through the second passageway to create temperature conditions substantially similar to conditions that are created due to a compressor valve leak.

20 Claims, 7 Drawing Sheets

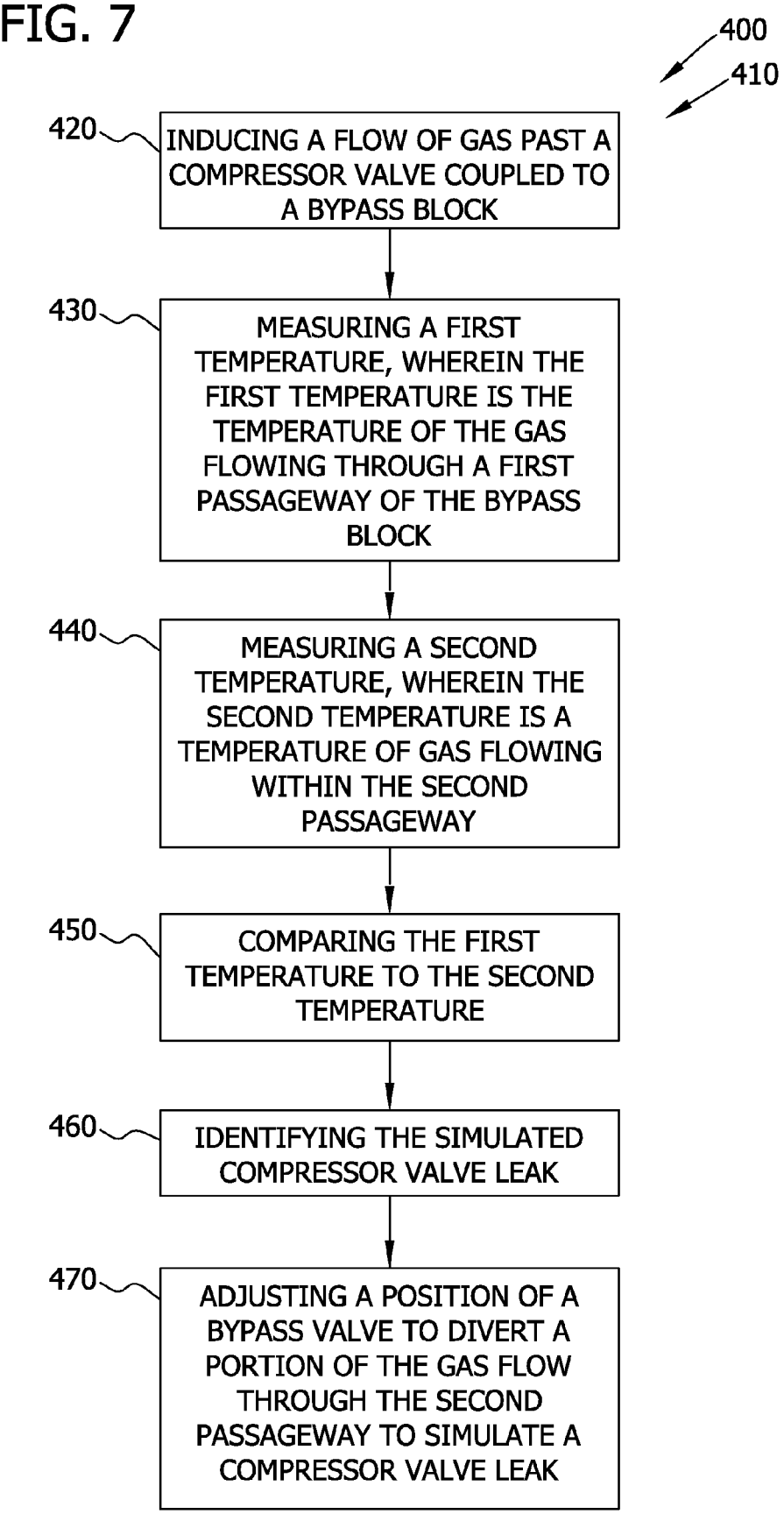

METHODS AND SYSTEMS FOR VALVE LEAK SIMULATION

BACKGROUND OF THE INVENTION

The field of the disclosure relates generally to valve leak detection, and more specifically to valve leak detection in a reciprocating compressor.

At least some known reciprocating compressors are capable of providing high pressure along with variable loading and are favored for many gas process applications in various manufacturing industries. Increased compressor reliability targets have highlighted a need for identification of problems that may be associated with such compressors, such as compressor valve leaks. Historically individuals have been trained to spot evidence of such leaks using pre-made, non real-time, simulated pressure and temperature diagrams.

For example, in some compressor systems, evidence of reciprocating compressor valve leaks is typically based on the comparison of a specific gas temperature and a related valve temperature. A leak is identified by a relative convergence or divergence of these temperatures. However, such detection methods are based in large part on the experience and expertise of the individual inspecting the compressor system. As such, often such detection methods are not reliable.

BRIEF DESCRIPTION OF THE INVENTION

In one aspect, a method for simulating a compressor valve leak is provided. The method includes inducing a flow of gas past a compressor valve that is coupled to a bypass block, wherein the bypass block defines a first passageway and a second passageway therein, and wherein the bypass block is also coupled to a bypass valve that is in flow communication with the second passageway. The method also includes measuring a first temperature and a second temperature. The first temperature is the temperature of the gas flowing through the first passageway of the bypass block and the second temperature is the temperature of gas flowing within the second passageway. The method also includes adjusting the bypass valve to divert a portion of the gas flowing through the second passageway to create temperature conditions substantially similar to conditions that are created due to a compressor valve leak.

In another aspect, a compressor valve leak detector is provided. The compressor valve leak detector includes bypass block that includes a first passageway and a second passageway defined therein. The compressor valve leak detector also includes a compressor valve input port in flow communication with the first passageway. The compressor valve input port is configured to receive a compressor valve therein. The first passageway at least partially defines a first gas flow path. The compressor valve leak detector also includes a bypass valve in flow communication with the second passageway. The bypass valve and the second passageway at least partially define a second gas flow path. The compressor valve leak detector also includes a gas temperature transducer coupled to the bypass block for measuring a temperature of gas within the first gas flow path. The compressor valve leak detector also includes a valve temperature transducer coupled to the bypass block for measuring a temperature of gas within the second gas flow path.

In yet another aspect, a reciprocating compressor demonstration system is provided. The reciprocating compressor demonstration system includes a compression chamber and at least one valve leak detector coupled to the compression chamber. The at least one valve leak detector includes a bypass valve configured to produce conditions substantially similar to conditions caused by a compressor valve leak.

BRIEF DESCRIPTION OF THE DRAWINGS

FIG. 7 is a flowchart of an exemplary method for simulating a reciprocating compressor valve leak.

DETAILED DESCRIPTION OF THE INVENTION

Figure 1:
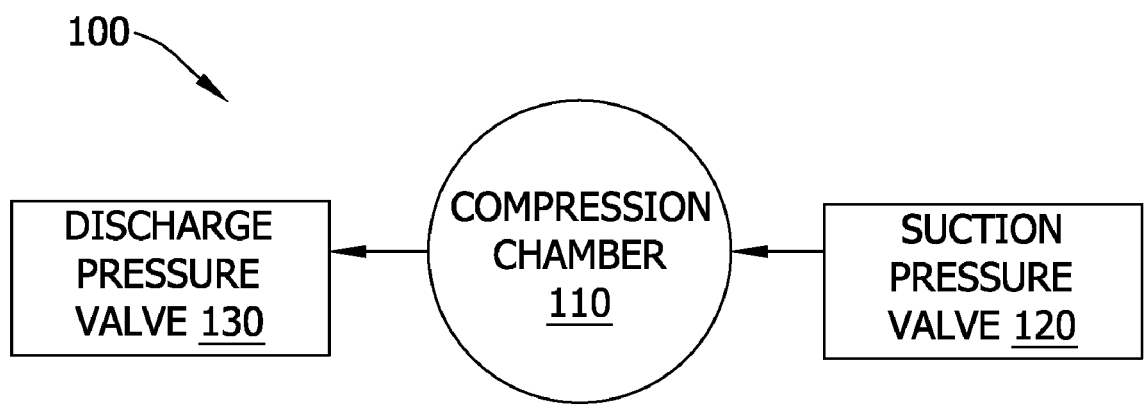
FIG. 1 is a block diagram of an exemplary reciprocating compressor.

FIG. 1 is a block diagram of an exemplary reciprocating compressor 100. In the exemplary embodiment, reciprocating compressor 100 includes a compression chamber 110, a suction pressure valve 120, and a discharge pressure valve 130. In the illustrated embodiment, compressor 100 includes only one compression chamber 110, however, compressor 100 may include any number of compression chambers 110, including, but not limited to, two compressor chambers. In each embodiment wherein compressor 100 includes at least two compressor chambers, each compression chamber 110 includes a suction pressure valve 120 and a discharge pressure valve 130. The efficiency of compressor 100 may be reduced by leaks in either suction valve 120 and/or discharge valve 130.

Figure 2:
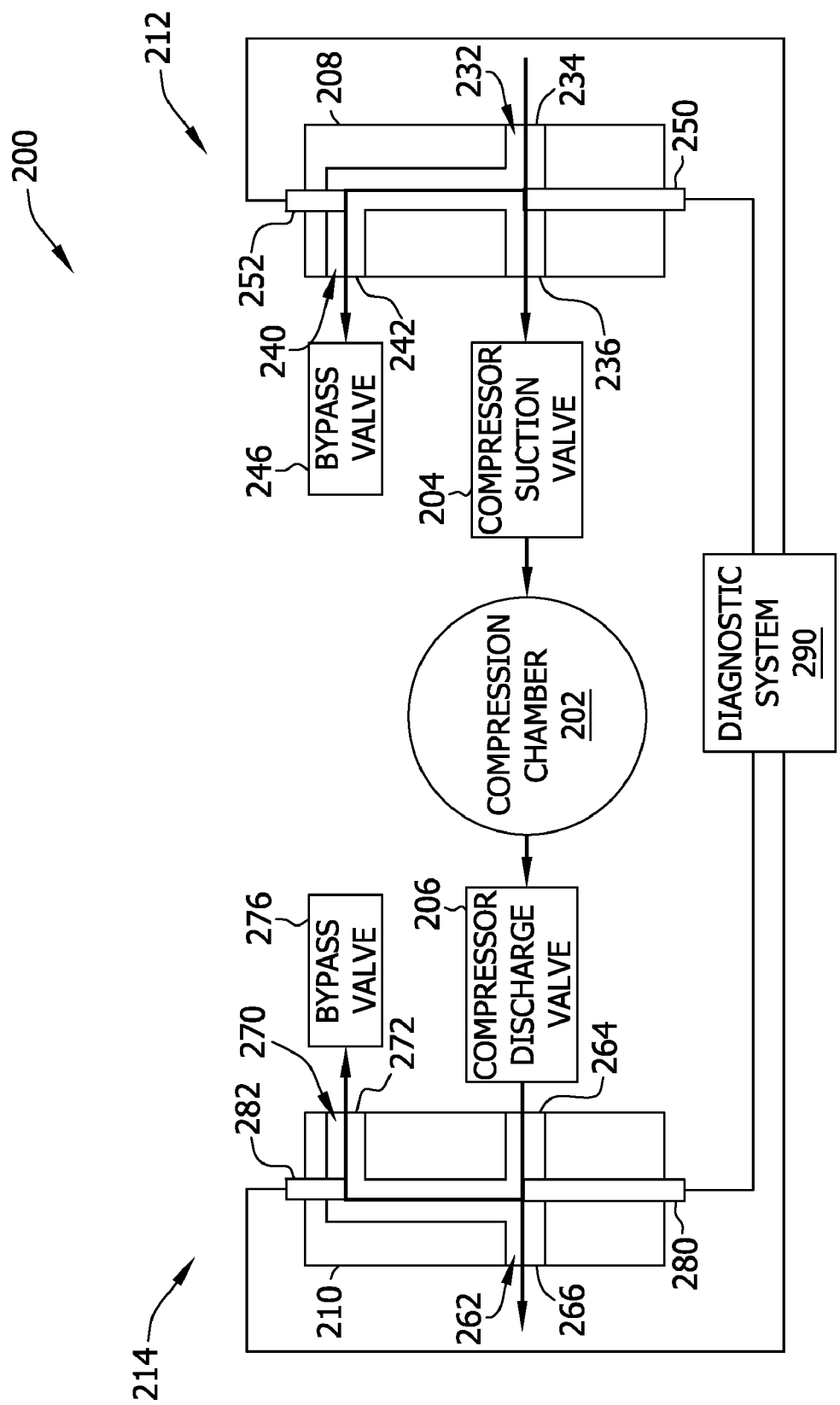
FIG. 2 is a block diagram of an exemplary reciprocating compressor demonstration kit including a first bypass block and a second bypass block.

FIG. 2 is a block diagram of an exemplary reciprocating compressor demonstration kit or system 200. In the exemplary embodiment, demonstration kit 200 includes a compression chamber 202, a compressor suction valve 204, a compressor discharge valve 206, a first bypass block 208, and a second bypass block 210. In the exemplary embodiment, first bypass block 208 is on a suction side 212 of compression chamber 202 and second bypass block 210 is on a discharge side 214 of compression chamber 202. Therefore, first bypass block 208 may also be referred to herein as suction bypass block 208 and second bypass block 210 may also be referred to herein as discharge bypass block 210. In some embodiments, compressor suction valve 204 and compressor discharge valve 206 are check valves that facilitate controlling the direction of gas flow.

In the exemplary embodiment, suction bypass block 208 includes a suction passageway 232 defined therein. Suction passageway 232 includes a gas intake port 234 that is in flow communication with a compressor suction valve port 236. Gas intake port 234 enables uncompressed air to be drawn into compression chamber 202. Suction check valve port 236 facilitates coupling suction check valve 204 to suction bypass block 208. Suction bypass block 208 also includes a bypass passageway 240 defined therein that includes a bypass valve port 242. Bypass valve port 242 is in flow communication with suction passageway 232 via bypass passageway 240, and receives and secures a bypass valve 246 to suction bypass block 208. In the exemplary embodiment, suction bypass block 208 also includes a suction gas temperature (SGT) transducer 250 and a suction valve temperature (SVT) transducer 252.

In the exemplary embodiment, discharge bypass block 210 includes a discharge passageway 262 defined therein. Discharge passageway 262 includes a discharge check valve port 264 that is in flow communication with a gas exhaust port 266. Discharge check valve port 264 facilitates coupling discharge check valve 206 to discharge bypass block 210. Discharge bypass block 210 also includes a bypass passageway 270 defined therein that includes a bypass valve port 272. Bypass valve port 272 is in flow communication with discharge passageway 262 via bypass passageway 270, and receives and secures a bypass valve 276 to discharge bypass block 210. In the exemplary embodiment, discharge bypass block 210 also includes a discharge gas temperature (DGT) transducer 280 and a discharge valve temperature (DVT) transducer 282.

In the exemplary embodiment, SGT transducer 250, SVT transducer 252, DGT transducer 280, and DVT transducer 282 are resistance temperature detectors. However, any temperature measuring devices may be used that enable bypass blocks 208 and 210 to function as described herein. SGT transducer 250 measures a temperature of gas flowing through suction passageway 232. In one example, in an open air compressor, the temperature measured by SGT transducer 250 is near a temperature of ambient air, since compression chamber 202 draws ambient air through suction passageway 232. DGT transducer 280 measures a temperature of gas exiting compression chamber 202 and channeled through discharge passageway 262. During steady-state operation of compressor demonstration kit 200, gas exiting compression chamber 202 is hot and compressed relative to ambient air drawn in through gas intake port 234.

To simulate steady-state operation (i.e., no valve leaks), suction bypass valve 246 and discharge bypass valve 276 are closed. When suction bypass valve 246 is closed, a column of air fills suction bypass passageway 240 and air flows through suction passageway 232 between gas intake port 234 and suction check valve port 236. During steady-state operation, the temperature measured by SGT transducer 250 is approximately equal to the temperature of the ambient air drawn in through gas intake port 234. During steady-state operation of compressor demonstration kit 200, the temperature measured by SVT transducer 252 is slightly higher than the temperature of ambient air drawn through gas intake port 234, because heat is generated by compression chamber 202. Such heat is transferred to components within compressor demonstration kit 200. However, a valve leak generally causes greater heating of components within a compressor, for example, compressor 100 (shown in FIG. 1), as a result of hot, compressed air leaking onto adjacent compressor components. The increased temperature or heat will be measured by SVT transducer 252, while the temperature measured by SGT transducer 250 (i.e., ambient air drawn through gas intake port 234) remains substantially unchanged. In other words, a valve leak may be detected on suction side 212 of compression chamber 202 when a divergence of the temperatures measured by SGT transducer 250 and SVT transducer 252 is determined.

Similarly, when discharge bypass valve 276 is closed, a column of air fills discharge bypass passageway 270 and air flows through discharge passageway 262 between discharge check valve port 264 and gas exhaust port 266. During steady-state operations (i.e., no valve leaks), the temperature measured by DGT transducer 280 is approximately equal to the temperature of the hot, compressed gasses discharged from compression chamber 202. During steady-state operations, the temperature measured by DVT transducer 282 is typically lower than the temperature of the hot, compressed gasses discharged from compression chamber 202 because, unlike DGT transducer 280 which is in direct contact with the flowing hot discharge gas, DVT transducer 282 is only in contact with the static air in bypass passageway 270. However, during operation of a compressor, for example, compressor 100 (shown in FIG. 1), a valve leak generally heats components within compressor 100 as a result of hot, compressed air leaking onto compressor components. The temperature increase will be measured by DVT transducer 282. Eventually, the temperature measured by DVT transducer 282 will be increased, towards the temperature of the hot compressed gasses, while the temperature measured by DGT transducer 280 (i.e., the temperature of the hot compressed gasses) remains substantially unchanged. In other words, a valve leak may be detected on discharge side 214 of compression chamber 202 when a convergence of the temperatures measured by DGT transducer 280 and DVT transducer 282 is determined.

In an exemplary embodiment, bypass valves 246 and 276 of reciprocating compressor demonstration kit 200 may be opened to simulate the effects of a valve leak within compressor 100. More specifically, bypass valves 246 and 276 may be opened to induce temperature swings or gradient changes from SGT transducer 250, SVT transducer 252, DGT transducer 280, and DVT transducer 282 that mimic those temperature measurements and gradients that would be sensed upon the occurrence of an actual valve leak. For example, if bypass valve 246 is opened, hot compressed gas flows past SVT transducer 252 and increases the temperature measured by SVT transducer 252. At the same time, the temperature measured by SGT transducer 250 remains substantially unchanged (e.g., a temperature of ambient air), and as such, the temperatures measured by SVT transducer 252 and SGT transducer 250 diverge.

In another example, if bypass valve 276 is opened, hot compressed gas flows past DVT transducer 282 and increases the temperature sensed by DVT transducer 282 until it is nearly equal to the temperature sensed by DGT transducer 280. Such a convergence of temperatures indicates the presence of a valve leak. In some embodiments, bypass valves 246 and 276 can each be adjusted to various valve settings to simulate valve leaks of varying severity.

In some embodiments, reciprocating compressor demonstration kit 200 includes, or is coupled to, a diagnostics system 290. More specifically, in the exemplary embodiment, SGT transducer 250, SVT transducer 252, DGT transducer 280, and DVT transducer 282 are each communicatively coupled to diagnostics system 290. SGT transducer 250, SVT transducer 252, DGT transducer 280, and DVT transducer 282 each provide real-time temperature data to diagnostics system 290. Reciprocating compressor demonstration kit 200 facilitates providing data to diagnostics system 290 that mimics temperature readings measured during operation of compressor 100, including temperature readings measured during operation of compressor 100 with a valve leak.

In some non-limiting examples, diagnostics system 290 includes a processor, for example, a personal computer (PC). The term processor, as used herein, refers to central processing units, microprocessors, microcontrollers, reduced instruction set circuits (RISC), application specific integrated circuits (ASIC), logic circuits, and any other circuit or processor capable of executing the functions described herein. The PC includes diagnostic software and/or firmware that receives temperature data from demonstration kit 200, and that provides demonstration kit 200 with data instructions. In some embodiments, diagnostics system 290 includes a display configured to display data provided from demonstration kit 200. Moreover, demonstration kit 200 may be used to simulate a compressor head end suction leak, a compressor head end discharge leak, a crank end suction leak, a crank end discharge leak, and a piston ring leak.

Figure 3:
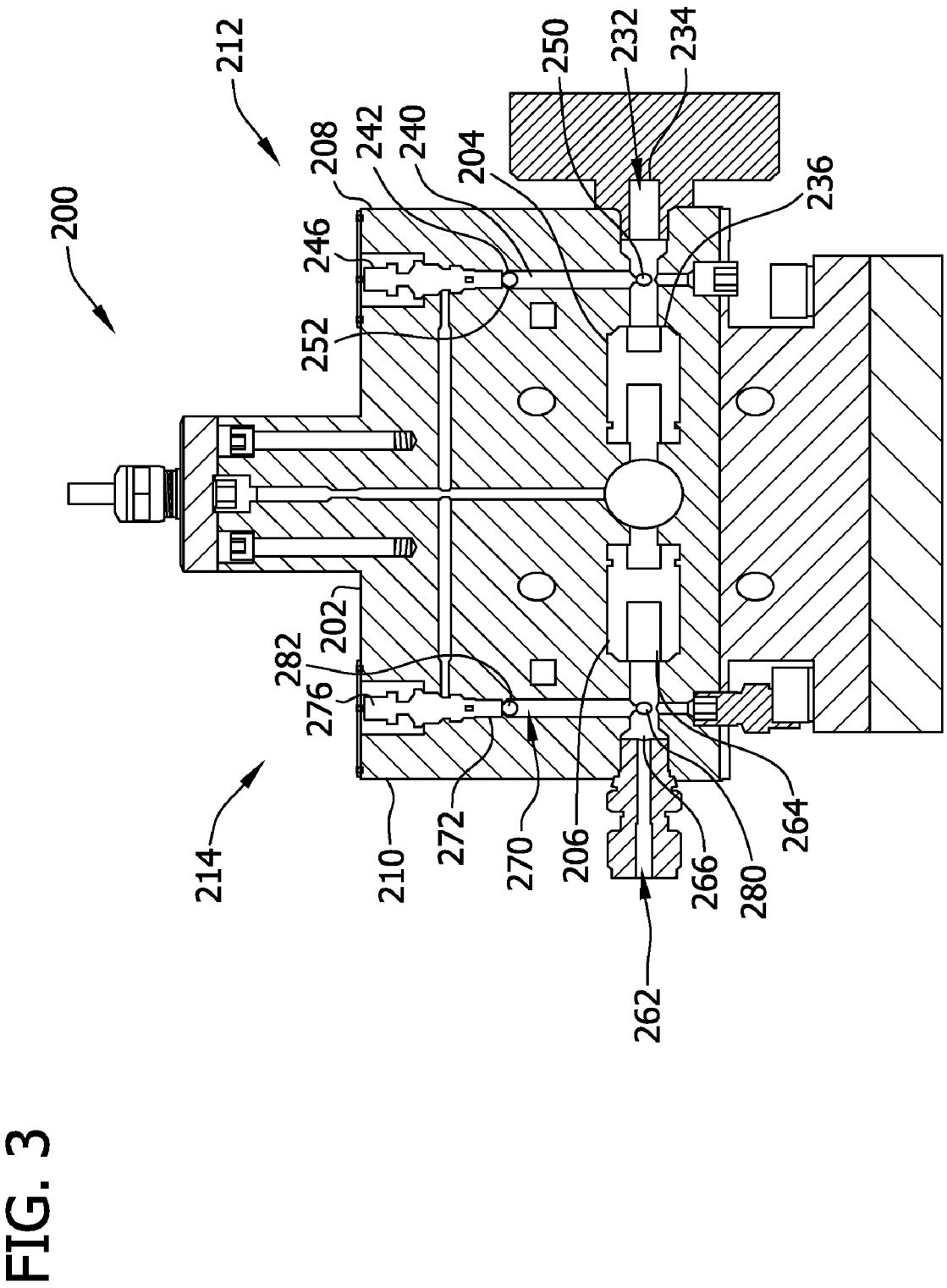
FIG. 3 is a cross-sectional view of exemplary reciprocating compressor demonstration kit or system.
Figure 4:
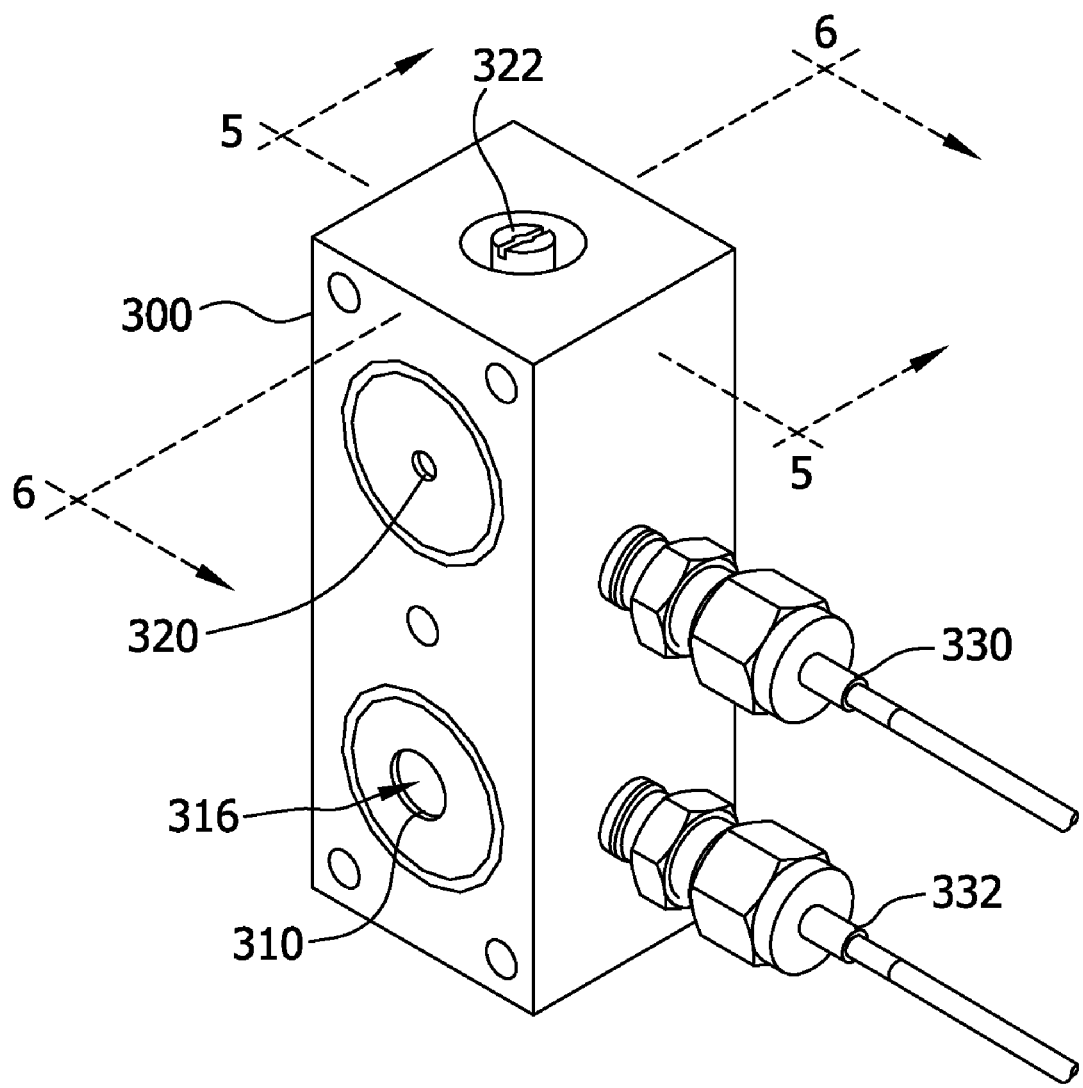
FIG. 4 is a perspective view of an exemplary bypass block for use in the compressor demonstration kit shown in FIG. 2.
Figure 5:
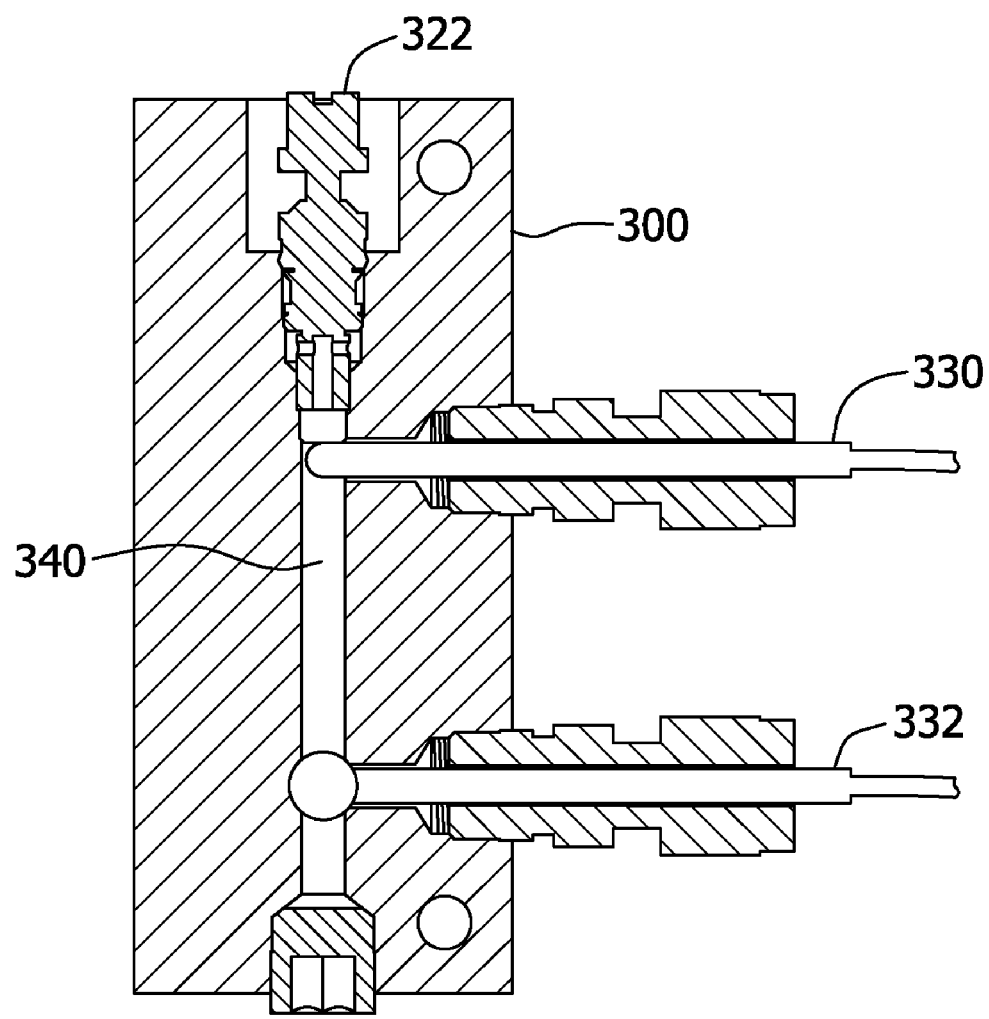
FIG. 5 is a first cross sectional view of the bypass block shown in FIG. 4 taken along line 5-5.
Figure 6:
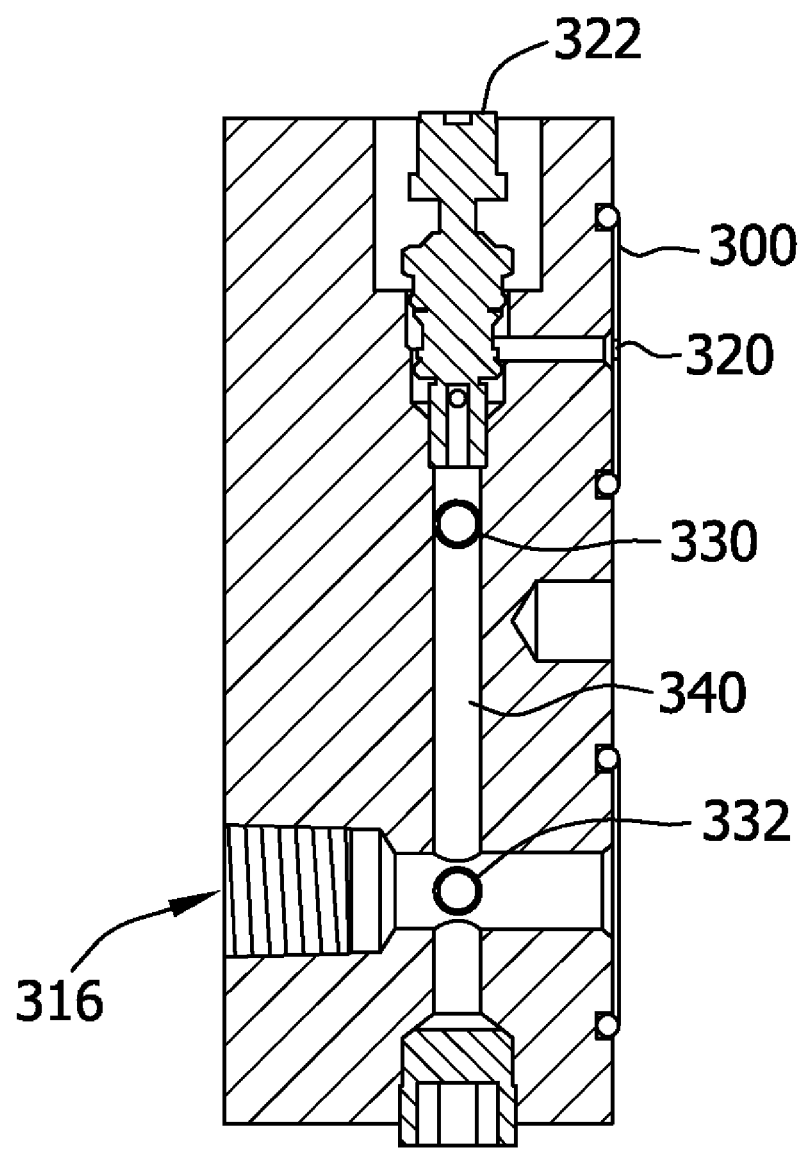
FIG. 6 is a second cross sectional view of the bypass block shown in FIG. 4 taken along line 6-6.

FIG. 3 is a cross-sectional view of exemplary reciprocating compressor demonstration kit or system 200 (shown in FIG. 2). Components shown in FIG. 2 and in FIG. 3 are identified with the same reference numerals. FIG. 4 is a perspective view of an exemplary bypass block 300, which may be used with reciprocating compressor demonstration kit 200 (shown in FIG. 2). FIG. 5 is a first cross sectional view of bypass block 300 taken along line 5-5 (shown in FIG. 4). FIG. 6 is a second cross sectional view of bypass block 300 taken along line 6-6 (shown in FIG. 4).

In the exemplary embodiment, bypass block 300 includes a gas intake port 310 that is in flow communication with a check valve port (not shown in FIG. 3) via a suction passageway 316. Bypass block 300 also includes a bypass port 320 and a bypass valve 322. In the example shown, bypass valve 322 is a needle valve. Alternatively, any type of valve that facilitates bypass block 300 functioning as described herein may be used. Bypass block 300 also includes a valve temperature transducer 330 and a gas temperature transducer 332. Although positioned differently, components of bypass block 300 are configured to operate in substantially the same manner as the corresponding components of bypass blocks 208 and 210, which are described above. A bypass passageway 340 is shown defined within bypass block 300.

FIG. 7 is a flowchart 400 of an exemplary method 410 for simulating a reciprocating compressor valve leak, for example, a valve leak in reciprocating compressor 100 (shown in FIG. 1). In the exemplary embodiment, method 410 includes inducing 420 a flow of gas past a compressor valve coupled to a bypass block, wherein the bypass block defines a first passageway and a second passageway therein. The bypass block is also coupled to a bypass valve that is in flow communication with the second passageway. More specifically, in the exemplary embodiment, method 410 includes inducing 420 a flow of gas past compressor check valve 204 (shown in FIG. 2) coupled to bypass block 208. In this example, bypass block 208 includes first passageway 232 (shown in FIG. 2) and second passageway 240 (shown in FIG. 2) defined therein. Bypass block 208 is also coupled to bypass valve 246 in flow communication with second passageway 240.

In an exemplary embodiment, method 410 also includes measuring 430 a first temperature, wherein the first temperature is the temperature of the gas flowing through a first passageway of a bypass block, for example, first passageway 232 (shown in FIG. 2) of bypass block 208 (shown in FIG. 2). Method 410 also includes measuring 440 a second temperature. The second temperature is the temperature of gas flowing through a second passageway, for example, second passageway 240 (shown in FIG. 2). Measuring 430 and 440 facilitates producing temperature data that corresponds to a simulated compressor valve leak. Measuring 430 the first temperature may include measuring 430 the temperature of a compressor discharge gas and measuring 440 the second temperature may include measuring 440 the temperature of gas within a discharge bypass passageway, for example, discharge bypass passageway 270 (shown in FIG. 2). Measuring 430 the first temperature may also include measuring 430 the temperature of a compressor suction gas and measuring 440 the second temperature may also include measuring 440 the temperature of a gas within a suction bypass passageway, for example, suction bypass passageway 240 (shown in FIG. 2).

In some embodiments, method 410 may also include comparing 450 the first temperature to the second temperature. Comparing 450 facilitates identifying 460 the simulated compressor valve leak. The simulated compressor valve leak may be identified 460 by a convergence of the discharge gas temperature and the temperature of gas within the discharge bypass passageway. The simulated compressor valve leak may also be identified 460 by a divergence of the compressor suction gas temperature and the temperature of gas within the suction bypass passageway. In some embodiments, method 410 may also include displaying at least one of the first temperature, the second temperature, and a difference between the first and the second temperatures. Furthermore, method 410 may include transmitting the first temperature and the second temperature to a diagnostics system.

In the exemplary embodiment, method 410 also includes adjusting 470 a position of a bypass valve, for example, bypass valve 246 (shown in FIG. 2) to cause a portion of gas flowing through the second passageway, for example, second passageway 240 (shown in FIG. 2), to be bled off or diverted to simulate a compressor valve leak. For example, bypass valve 246 may be adjusted to divert a portion of the gas flowing through second passageway 240 to create temperature conditions substantially similar to conditions that are created due to a compressor valve leak.

The methods and systems described herein enable a user to induce a bypass at a pertinent compressor check valve that will redirect compressed gas past a temperature measurement device, to simulate the effects of a compressor valve leak. The methods and systems described herein enable a user to present real-time temperature data to a diagnostics system, wherein the real-time temperature data corresponds to conditions that occur during a mechanical valve leak. The data includes appropriate temperature and P/V diagram characteristics that are created using only the heat and pressure generated during compression. Furthermore, the valve leak simulation device described herein facilitates the simulation of an actual valve leak on a demonstration kit scale. More specifically, in some embodiments, during steady-state conditions, an SGT will be approximately equal to an ambient air temperature, and an SVT will be slightly hotter as a result of its direct thermal contact with the compressor. In the event of a suction valve leak, the suction gas and the suction valve temperatures will diverge based on the severity of the leak. With the kit described herein, a suction valve leak may be simulated by opening a bypass valve and allowing heated air (byproduct of the compression process) to flow past an SVT transducer within a bypass block. This induces a further divergence of temperatures between the SVT and SGT. The ratio of the two temperatures can be shown and acted upon by a diagnostics system, which may include diagnostic software.

Furthermore, as described herein, a discharge valve leak can be simulated and detected by a diagnostics system. In the event of a discharge valve leak, the discharge gas and discharge valve temperatures will converge based on the severity of the leak. The compressor valve leak simulation kit described herein facilitates presenting characteristics of a valve leak to a diagnostics system using a compact simulation device.

The methods and systems described herein facilitate inducing a bypass at a pertinent compressor check valve that will redirect compressed gas past a temperature measurement device to simulate a valve leak, including an increase in valve temperature of the respective valve. The increase in valve temperature may then be compared to the gas flow temperature within the same bypass block.

The methods and systems described herein facilitate simulating a mechanical valve leak with appropriate temperature and P/V diagram characteristics that correspond to actual valve leak temperatures and P/V diagram characteristics, using only the heat and pressure generated by compression. Furthermore, the methods and systems described herein allow a user to effectively demonstrate a valve leak within a reciprocating compressor, for example, for the purpose of sales and/or training. An output from the simulation device described herein may be provided to a diagnostics system and the device may be acted on by the diagnostic system. In the exemplary embodiment, the methods and systems described herein facilitate cost effective training and demonstration of a reciprocating compressor valve leak, and related diagnostics systems.

Exemplary embodiments of methods and apparatus for simulating valve leaks are described above in detail. The methods and systems are not limited to the specific embodiments described herein, but rather, components of systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for simulating a compressor valve leak, said method comprising:
   inducing a flow of gas past a compressor valve that is coupled to a bypass block, wherein the bypass block defines a first passageway and a second passageway therein, and wherein the bypass block is also coupled to a bypass valve that is in flow communication with the second passageway;
   measuring a first temperature, wherein the first temperature is the temperature of the gas flowing through the first passageway of the bypass block;
   measuring a second temperature, wherein the second temperature is the temperature of gas flowing within the second passageway; and
   adjusting the bypass valve to divert a portion of the gas flowing through the second passageway to create temperature conditions substantially similar to conditions that are created due to a compressor valve leak.

2. A method in accordance with claim 1, wherein measuring the first temperature comprises measuring the temperature of a compressor discharge gas, and measuring the second temperature comprises measuring the temperature of gas within a discharge bypass passageway.

3. A method in accordance with claim 2, further comprising comparing the first temperature to the second temperature to identify the simulated compressor valve leak, wherein a convergence of the discharge gas temperature and the temperature of gas within the discharge bypass passageway indicates the presence of a compressor valve leak.

4. A method in accordance with claim 1, wherein measuring the first temperature comprises measuring the temperature of a compressor suction gas, and measuring the second temperature comprises measuring the temperature of gas within a suction bypass passageway.

5. A method in accordance with claim 4, further comprising comparing the first temperature to the second temperature to identify the simulated compressor valve leak, wherein a divergence of the compressor suction gas temperature and the temperature of gas within the suction bypass passageway indicates the presence of a compressor valve leak.

6. A method in accordance with claim 1, further comprising displaying at least one of the first temperature, the second temperature, and a difference between the first temperature and the second temperature, to facilitate tracking temperature changes.

7. A method in accordance with claim 1, wherein measuring the first temperature and the second temperature comprises receiving the first temperature and the second temperature at a diagnostics system.

8. A compressor valve leak detector comprising:
   a bypass block comprising a first passageway and a second passageway defined therein;
   a compressor valve input port in flow communication with said first passageway, said compressor valve input port configured to receive a compressor valve therein, said first passageway at least partially defining a first gas flow path;
   a bypass valve in flow communication with said second passageway, said bypass valve and said second passageway at least partially defining a second gas flow path;
   a gas temperature transducer coupled to said bypass block for measuring a temperature of gas within the first gas flow path; and
   a valve temperature transducer coupled to said bypass block for measuring a temperature of gas within the second gas flow path, wherein the temperature of gas measured by each of said gas temperature transducer and said valve temperature transducer facilitate the detection of a compressor valve leak by a diagnostics system.

9. A compressor valve leak detector in accordance with claim 8, wherein said bypass valve is configured to simulate a compressor valve leak by diverting gas flow from the first gas flow path to the second gas flow path.

10. A compressor valve leak detector in accordance with claim 8, wherein said compressor valve comprises at least one of a discharge check valve or a suction check valve.

11. A compressor valve leak detector in accordance with claim 8, wherein said gas temperature transducer comprises at least one of a discharge gas temperature transducer or a suction gas temperature transducer.

12. A compressor valve leak detector in accordance with claim 8, wherein said compressor valve leak detector is configured to simulate steady-state operation of the compressor when said bypass valve is closed and to simulate a compressor valve leak when said bypass valve is open.

13. A compressor valve leak detector in accordance with claim 8, wherein said gas temperature transducer and said valve temperature transducer are each coupled to a diagnostics system.

14. A compressor valve leak detector in accordance with claim 13, wherein said diagnostics system is configured to identify a compressor valve leak by monitoring changes between the temperature of gas flowing through the first gas flow path and the temperature of gas flowing through the second gas flow path.

15. A compressor valve leak detector in accordance with claim 8, wherein said gas temperature transducer and said valve temperature transducer are resistance temperature detectors.

16. A reciprocating compressor demonstration system comprising:
   a compression chamber; and
   at least one valve leak detector coupled to said compression chamber, said at least one valve leak detector comprising a bypass valve configured to produce conditions substantially similar to conditions caused by a compressor valve leak.

17. A reciprocating compressor demonstration system in accordance with claim 16, wherein said at least one valve leak detector further comprises a gas temperature transducer and a valve temperature transducer.

18. A reciprocating compressor demonstration system in accordance with claim 17, wherein said gas temperature transducer is one of a compressor discharge gas temperature transducer or a compressor suction gas temperature transducer.

19. A reciprocating compressor demonstration system in accordance with claim 17, wherein said gas temperature transducer and said valve temperature transducer are configured to provide temperature measurements to a diagnostics system.

20. A reciprocating compressor demonstration system in accordance with claim 17, wherein said at least one valve leak detector is configured to divert a flow of compressed gas across said valve temperature transducer to increase a temperature sensed at said valve temperature transducer, which simulates conditions produced by a compressor valve leak.

\* \* \* \* \*